Dec. 15, 1942.     J. P. HURNDALL     2,305,531
APPARATUS FOR MEASURING VISCOSITY OF FLUIDS
Filed June 5, 1939
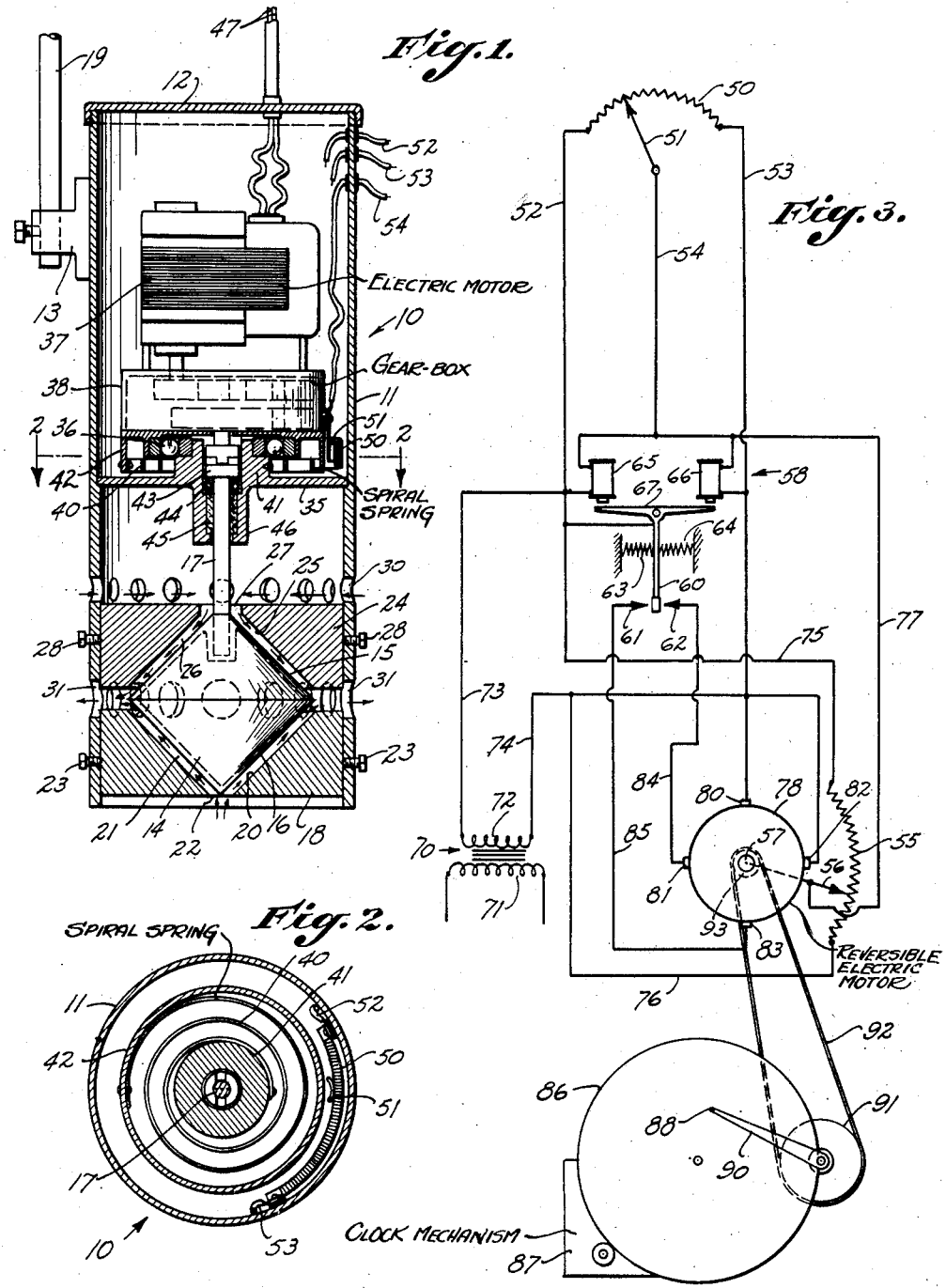
INVENTOR.
John P. Hurndall,
BY Russell M. Otis
ATTORNEY.

Patented Dec. 15, 1942

2,305,531

UNITED STATES PATENT OFFICE 2,305,531

APPARATUS FOR MEASURING VISCOSITY OF FLUIDS

John P. Hurndall, Los Angeles, Calif., assignor to Petroleum Instrument Corporation, Los Angeles, Calif., a corporation of California Application June 5, 1939, Serial No. 277,387

2 Claims. (Cl. 265—11)

This invention relates to apparatus for measuring the viscosity of fluids and has a particularly valuable application to the problem of continuously measuring and recording the viscosity of relatively thick liquid subject to change in its viscosity, such, for example, as mud employed in drilling oil wells.

In drilling oil wells, mud is continuously circulated down the well, through the drill and back to the surface of the earth. It is of considerable importance for efficient drilling to maintain the viscosity of the drilling mud substantially at a predetermined value. Since the viscosity of the mud is liable to change by reason of change in temperature, dilution with water in the well, etc. it has been common practice to withdraw samples of mud from the mud return ditch from time to time and make a hand test of these samples. It has been found, however, that this procedure requires considerable time and effort, is inaccurate, and does not provide a continuous record of the viscosity.

An object of my invention, therefore, is to provide an apparatus for continuously measuring and recording the viscosity of a fluid.

Another object is to provide an apparatus for measuring viscosity of a fluid, in which the fluid is circulated through the apparatus by the pump action of parts of the measuring apparatus.

Another object is to provide an apparatus for measuring viscosity of a fluid, in which the range of viscosity to which the instrument is adapted can be easily adjusted.

Another object is to provide an apparatus for measuring viscosity of a fluid, in which the fluid has access only to certain parts of the apparatus where its presence is not detrimental.

Still another object of the invention is to provide an apparatus for measuring and recording viscosity of a fluid which is simple and economical in construction, dependable in operation, requires little attention, and is of long life.

These and other apparent objects are attained in a manner which will be clear from consideration of the following description taken in connection with the accompanying drawing, of which:

Fig. 1 is an elevational view in section of that portion of my apparatus which is placed in the fluid whose viscosity is to be measured.

Fig. 2 is a sectional view of the unit of Fig. 1 taken along the line 2—2, as indicated.

Fig. 3 is a diagrammatic illustration of the electrical circuit and means for recording the viscosity, which are employed in my apparatus.

In the disclosed embodiment, my apparatus comprises a unit, generally designated by the numeral 10, which is placed in the fluid whose viscosity is to be measured, and electrical apparatus connected to the unit 10, as hereinafter described, for measuring and recording the viscosity of the fluid. The unit 10 comprises a housing in the form of a shell 11 closed at its top by a fluid-tight cap 12. Means for non-rotatably supporting the unit 10 are provided and may include a lug 13 on the side of the shell 11 into which a supporting rod 19 fits and is secured by a screw.

Preferably in the lower part of the shell 11, I provide a rotating body positioned between an upper stationary surface and a lower stationary surface and introduce the fluid to be tested between these surfaces and the rotating body. The fluid is preferably led to the space between the surfaces and the rotating body at points near the axis of rotation and is withdrawn adjacent the periphery of the rotating body, the fluid being moved outwardly by reason of centrifugal force due to its rotation induced by contact with the rotating body.

In the disclosed embodiment, the rotating body is preferably a hollow closed member 14 having the shape of two cones joined together at their bases to provide an upper conical surface 15 and a lower conical surface 16. A shaft 17 is attached to the member 14 and extends axially upward therefrom. A block 18 having a conical surface 20 of substantially the same angularity relative to the axis as the surface 16 surrounds the lower part of the member 14 and is spaced therefrom so as to provide a conical fluid passage 21 of substantially uniform thickness between the surfaces 16 and 20. The member 18 has a central opening 22 therein which places the passage 21 in communication with the space outside of the unit 10. The member 18 may have an exterior side surface fitting the interior of the shell 11 and may be held in a selected position by setscrews 23 passing through the shell 11. It is apparent that the thickness of the fluid passage 21 may be adjusted by moving the block 18 vertically up or down and fixing it in the desired position by tightening the screws 23.

Another block 24 having a conical inner surface 25, of substantially the same angularity relative to the axis as the surface 15, surrounds the upper part of the member 14 and is spaced therefrom so as to provide a conically shaped fluid passage 26 of substantially uniform thickness between the surfaces 15 and 25. The member 24 has a central opening 27 therein which places the passage 26 in communication with the space above the member 24 and through which the shaft 17 extends. The member 24 has an exterior side surface fitting the shell 11 and is retained in position by set-screws 28 passing through the shell 11. The member 24 may be moved vertically up or down to vary the thickness of the fluid passage 26.

Immediately above the block 24 are located a plurality of apertures 30 through the shell 11 which place the space above the block 24 in communication with the space outside of the unit 10. Opposite the periphery of the rotating member 14 are a plurality of discharge apertures 31 through which the fluid passages 21 and 26 communicate with the space outside of the unit 10. It will be clear that fluid in which the unit 10 is submerged can pass through apertures 30, passages 27, 26, and apertures 31, or can pass through passages 22, 21 and apertures 31 to the space outside of the unit 10 from whence it started.

At an elevation considerably above the apertures 30 is fixed a horizontal partition 35 on which is rotatably supported through the bearing 36 preferably a constant speed electric motor 37 and a gear box 38. The frame of the motor 37 and the case of the gear box 38 are connected together for rotation and are restrained by a spiral spring 40 which may be disposed between the bearing 36 and the partition 35 and which is attached at its inner end to a vertically extending boss 41 forming a part of the partition 35 and at its outer end to a downwardly extending ring 42 forming a part of the case of the gear box 38. The gears within the gear box are connected to the shaft of the motor 37 and through a coupling 43 to the shaft 17 in such manner that the motor 37 drives the shaft 17 at a reduced speed. The shaft 17 and coupling 43 may be rotatably supported on a bearing 44 mounted in the partition 35. A loosely fitting packing 45 may surround the shaft 17 and be contained within a downwardly extending tubular portion 46 of the partition 35. The packing 45 preferably fits so loosely as to require substantially no torque to turn the shaft 17 within it. Electrical supply conductors 47 pass through preferably a fluid-tight seal in the cap 12 and connect with the motor 37.

The direction of rotation of the motor 37 is such that the shaft 17 rotates clockwise in Fig. 2. Torque will be required to turn the rotating member 14 in contact with the fluid in passages 21 and 26 and, since action is equal to reaction, the frame of the motor 37 and the gear box 38 will tend to rotate in a counter-clockwise direction in Fig. 2, opposite to the direction of rotation of the shaft 17, with substantially the same torque as is required to turn the shaft 17. As the frame of the motor and the gear box turn, the spring 40 is wound up and resists turning. It will be evident that the ring 42, then, will come to an equilibrium position when the resisting torque of the spring 40 is substantially equal to the torque being applied in turning the shaft 17. The angular displacement of the ring 42, therefore, is a measure of the torque on the shaft 17.

To measure the angular position of the ring 42 I provide an electric resistance element 50 preferably disposed along an arc in the space between the ring 42 and the shell 11 and supported on the shell 11, and a contact element 51 mechanically connected for rotation with the ring 42 but electrically insulated therefrom and bearing lightly on the resistance 50. These elements are connected in an electric circuit such as that illustrated in Fig. 3. The ends of the resistance 50 are electrically connected to conductors 52 and 53 and the contact element 51 is electrically connected to an electric conductor 54, the conductors 52, 53, and 54 passing out through preferably fluid-tight seals in the shell 11. The parts are preferably so related that the contact element 51 occupies a position near the end of the resistance 50 connected to the conductor 53 when no torque is applied to the shaft 17.

The conductors 52, 53, and 54 extend to a registering and recording apparatus which may be located at a considerable distance from the unit 10 and which includes another resistance element 55 preferably identical to the resistance 50 and having in contact therewith a contact element 56 mounted on a rotatable arm attached for rotation with the shaft 57. The apparatus is adapted to maintain the contact element 56 in a position relative to the resistance element 55 corresponding to the position of the contact element 51 relative to the resistance element 50. In the disclosed embodiment the apparatus includes a relay 58 comprising a contact arm 60 normally balanced between contacts 61 and 62 by springs 63 and 64, and electromagnets 65 and 66 adapted when energized to act upon the pivoted magnetic armature 67 to cause the contact arm 60 to engage one or the other of the contacts 61 and 62. The relay is so arranged that if the electromagnet 65 alone were energized or energized to a greater degree than the electromagnet 66 the contact arm 60 would make contact with the contact 61, and if the electromagnet 66 alone were energized or energized to a greater degree than the electromagnet 65 the contact arm 60 would contact the contact 62.

As a source of electric current, a transformer 70 is preferably employed having a primary 71 connected to the supply lines and a secondary 72 having conductors 73 and 74 connected to the terminals thereof. The electromagnet coil 65 is connected between the conductors 73 and 54, and the electromagnet coil 66 is connected between the conductors 74 and 54. The conductors 52 and 53 are connected respectively to the conductors 73 and 74, and the contact arm 60 is connected to the conductor 73. The ends of the resistance 58 are connected through the conductors 75 and 76 to the conductors 73 and 74, respectively. The contact elements 51 and 56 are connected together through the conductor 77. The shaft 57, to which the contact element 56 is attached, is turned by a reversible electric motor 78 preferably having two fields in circuit respectively with terminals 80, 81 and 82, 83. The motor 78 is adapted to rotate the shaft 57 in a clockwise direction in Fig. 3 when the terminals 80, 81 are energized and to rotate the shaft 57 in a counter-clockwise direction when the terminals 82, 83 are energized. The terminals 80 and 82 are connected together and to the conductor 74, and the terminals 81 and 83 are connected, respectively, to the relay contacts 62 and 61 through the conductors 84 and 85, respectively.

While the position of the contact element 56 serves to indicate the position of the contact element 51, I preferably continuously record the position of the contact element 56. A disc 86 may be driven by a clock mechanism 87 at a constant angular velocity. A pen or pencil 88 is carried on a rotatable arm 90 and is adapted to make a record on a paper disc carried on the disc 86. The arm 90 is connected for rotation with a pulley 91 which is driven by a spring belt 92 from a pulley 93 on the shaft 57.

The operation of the apparatus of Fig. 3 to indicate and record the position of the contact element 51 within the unit 10 is as follows. By reason of the electrical connections, above-described, between the various parts, the electromagnet coil 65 is always shunted by both the resistance of the element 50 lying between the contact element 51 and the conductor 52 and the resistance of the element 55 lying between the contact element 56 and the conductor 75. The electromagnet coil 66 is always shunted between the resistance of element 50 lying between the contact element 51 and the conductor 53 and also by the resistance of the element 55 lying between the contact element 56 and the conductor 76. It will be evident that if the resistance elements 50 and 55 are identical and if the contact element 56 occupies a position along the resistance element 55 in which the resistance of element 55 between the contact 56 and the conductor 76 is equal to the resistance of the resistance element 50 lying between the contact 51 and the conductor 52, each of the electromagnet coils 65 and 66 will be shunted by the same resistance and each will have the same current passing through it. Each electromagnet will, therefore, exert the same force on the armature 67 and the contact arm 60 will be balanced between the contacts 61 and 62 in contact with neither of them. This is the relation which the apparatus is adapted to maintain.

If, however, the contact element 51, for example, is displaced in a clockwise direction, in Fig. 3, by reason of a reduced torque on the shaft 17, that part of the resistance of element 50 shunting the coil 65 is increased and that part shunting the coil 66 is decreased. The result is a greater current through the coil 65 and less current through the coil 66. The contact arm 60 is then drawn into contact with the contact 61, energizing the motor field 82, 83. The shaft 57 and the contact element 56 are then rotated in a counter-clockwise direction until the increase in resistance of the element 50 shunting the coil 65 has been balanced by the decrease in the resistance of the element 55 shunting the coil 65, whereupon the current through the coils 65 and 66 is again equalized and the contact arm 60 is again permitted to assume a neutral position and the motor 78 is de-energized. It will be clear that if the contact element 51 is moved in a counter-clockwise direction, in Fig. 3, to a new position along the resistance element 50 that the relay 58 will function to energize the motor 78 to cause the contact element 56 to be moved through a corresponding angle in a clockwise direction along the resistance element 55. In this manner the apparatus functions to move the contact element 56 in the same manner and to the same degree as the contact element 51 within the unit 10, and it will be clear that the movement and position of the contact element 56 is continuously recorded on the chart carried by the moving disc 86.

In use, the unit 10 is lowered into the fluid whose viscosity is to be determined, which will here be assumed to be drilling mud. The unit 10 may conveniently be submerged in the mud in the ditch through which it flows from the well. Mud flows in through the passage 22 and the apertures 30 and 31 and fills the passages 21 and 26. Electric current is then supplied to the conductors 47 and the motor 37 turns the shaft 17 and the body 14 in a clockwise direction, in Fig. 2, at a predetermined constant speed. The mud in the passages 21 and 26 in on one side in contact with stationary surfaces 20 and 25 and on the other side in contact with the rotating surfaces 16 and 15. The rotating surfaces 16 and 15 tend to drag the adjacent layers of mud along with them and these layers tend in turn to drag adjacent layers of mud along with them. The stationary surfaces 20 and 25, however, tend to maintain the layers of mud adjacent thereto stationary. There is, thus, set up in the mud in the passages 21 and 26 a force of resistance tending to prevent rotation of the body 14. The resistance offered by a fluid to the relative motion of its particles is spoken of as viscosity, and the torque required to rotate the body 14 at a certain speed is found to be a measure of the viscosity of the mud or other fluid in the passages 21 and 26. Fluids with high viscosity require relatively greater torque to be exerted on the shaft 17 to rotate the body 14 at a given speed than do fluids with low viscosity. The power required to rotate the shaft 17 at a given speed is a measure of the torque on the shaft 17 but I prefer to measure the torque by means of the apparatus above-described. In this apparatus, it will be evident that the frame of the motor 37, the gear box 38, and the contact element 51 will rotate in a counter-clockwise direction until the resisting torque of the spring 40 substantially equals the torque applied to the shaft 17. The displacement of the contact element 51 thus becomes a measure of the torque applied to the shaft 17 and of the viscosity of the mud in the passages 21 and 26; and since, as described above, the position of the contact element 56 and of the pen 88 accurately follow that of the contact element 51, it is clear that the displacement of the pen 88 is a measure of the viscosity of the mud and continuously records the viscosity.

Should it be desired to change the range of viscosity measured by the instrument it is only necessary to loosen the set-screws 23 and 28 and move the blocks 18 and 24 to new positions and again tighten the set-screws. Moving the blocks 18 and 24 closer to the member 14 causes the instrument to be sensitive to lower viscosities, while moving the blocks away from the member 14 increases the viscosities which the instrument is adapted to measure.

Because of the drag of the rotating surfaces 15 and 16 on the mud in the adjacent passages, the mud is rotated therein and is subject to centrifugal force which throws it outwardly toward the periphery of the body 14. This action produces a gentle flow of mud from the passages 22 and 27 along the passages 21 and 26, respectively, toward the apertures 31. Thus, there is a continuous circulation of mud from outside the unit 10 through the apertures 30, passages 27 and 26, and apertures 31 and also through the passages 22, 21, and apertures 31 to the mud outside. This circulation of mud through the unit assures that when the viscosity of the mud in the ditch changes, the change is immediately observed by the apparatus, which would not be the case if change of the mud being measured were left to be accomplished by diffusion alone. This is a very valuable and important feature especially when the instrument is employed in such a viscous fluid as drilling mud. It is also significant that the circulation is produced not by use of any auxiliary apparatus but rather by action of the parts of the measuring apparatus itself.

It will be observed that the upper compartment of the unit 10 which houses the motor 37, etc., is substantially fluid-tight and that the space within the shell 11 and above the block 24 is substantially closed at the top to fluid. Because of this construction mud is prevented from access to the more delicate parts of the instrument. Mud entering through the apertures 30 under a slight static head compresses the air which is trapped below the partition 35 and is prevented from rising. Should any air escape through the loose fitting packing 45 into the upper compartment it merely goes to compress the air in that compartment.

My apparatus has been found to be accurate and dependable in measurement of viscosity and to respond quickly to changes in the viscosity of the fluid being measured. While I have described its operation in connection with the measurement and recording of the viscosity of drilling mud, it will be understood that the apparatus is adapted to measure the viscosity of other fluids as well.

In the disclosed embodiment the rotating member 14 has conically shaped surfaces, which are surfaces of revolution about the axis of rotation of the member 14, that is, surfaces which may be formed by revolving a line, either straight, curved, or crooked, about the axis of rotation; but the rotating member may be constructed with surfaces of revolution of any other suitable shape. It may, for example, be spherical, or it may simply be a flat plate. In all cases, however, the surfaces of the blocks 18 and 24 adjacent the rotating member are preferably shaped to conform to the surfaces of the rotating member and the fluid to be tested is introduced into the passages between the rotating member and the adjacent stationary surfaces at points relatively near the axis of rotation and is withdrawn relatively farther from the axis so as to produce a circulatory action. It is understood that various other changes and modifications in design and construction may be made by those skilled in the art without departing from the spirit and scope of the invention as defined in the appended claims.

I claim as my invention:

1. Apparatus for measuring viscosity of a fluid, comprising: a housing; a member mounted for rotation within said housing and having upper and lower surfaces directed outwardly from the axis of rotation; a first stationary member supported by said housing and having a surface substantially conforming in shape to said upper surface and spaced therefrom, said first stationary member being adjustable in said housing toward or away from said upper surface; a second stationary member supported by said housing and having a surface substantially conforming in shape to said lower surface and spaced therefrom, said second stationary member being adjustable in said housing toward or away from said lower surface; said housing having walls forming an inlet opening through said housing; said first stationary member having walls forming an inlet opening from the space within said housing into the space between said first stationary member and said upper surface; said second stationary member having walls forming an inlet opening into the space between said second stationary member and said lower surface; said stationary members and said housing having walls forming a discharge opening into the space outside of said housing from the space between said first stationary member and said upper surface and from the space between said second stationary member and said lower surface; a partition in said housing positioned above said first stationary member and substantially sealing the upper portion of said housing from the lower portion thereof; a shaft connected to said rotatable member and extending upwardly through said partition; an electric motor in the upper portion of said housing adapted to rotate said shaft; and means for measuring the torque required to rotate said shaft.

2. Apparatus for measuring viscosity of a fluid, comprising: a housing, the upper portion of which is substantially closed and fluid-tight; a rotatable member within the lower portion of said housing having upper and lower surfaces which are surfaces of revolution about the axis of rotation of said member; upper and lower stationary members disposed within said housing in spaced relation with the upper and lower sides, respectively, of said rotatable member and forming with said upper and lower sides of said rotatable member upper and lower fluid passages; said housing and said stationary members having walls forming inlet and discharge openings for said fluid passages including apertures through said housing above said upper stationary member, said discharge openings being located farther from said axis of rotation than said inlet openings; an electric motor in the upper portion of said housing above said apertures and adapted to rotate said rotatable member; and means for measuring the torque required to rotate said rotatable member.

JOHN P. HURNDALL.